(12) United States Patent
Battle et al.

(10) Patent No.: US 7,673,001 B1
(45) Date of Patent: Mar. 2, 2010

(54) ENTERPRISE MANAGEMENT OF PUBLIC INSTANT MESSAGE COMMUNICATIONS

(75) Inventors: Ryan W. Battle, Seattle, WA (US); Kenneth Fern, Bellevue, WA (US); Peter Ollodart, Kent, WA (US); Austina De Bonte, Woodinville, WA (US); Yikang Xu, Redmond, WA (US); Christer Lundin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1390 days.

(21) Appl. No.: 10/720,034

(22) Filed: Nov. 21, 2003

(51) Int. Cl.
G06F 15/16 (2006.01)

(52) U.S. Cl. ............... 709/206; 709/219; 709/225

(58) Field of Classification Search ........... 709/206, 709/219, 225
See application file for complete search history.

(56) References Cited

U.S. PATENT DOCUMENTS

| | | | |
|---|---|---|---|
| 6,415,318 B1 | 7/2002 | Aggarwal et al. | |
| 6,519,639 B1 | 2/2003 | Glasser et al. | |
| 6,549,937 B1* | 4/2003 | Auerbach et al. | 709/206 |
| 6,604,133 B2 | 8/2003 | Aggarwal et al. | |
| 6,631,412 B1 | 10/2003 | Glasser et al. | |
| 7,016,978 B2* | 3/2006 | Malik et al. | 709/246 |
| 7,299,259 B2* | 11/2007 | Petrovykh | 709/205 |
| 2002/0173308 A1* | 11/2002 | Dorenbosch et al. | 455/435 |
| 2003/0131061 A1* | 7/2003 | Newton et al. | 709/206 |
| 2003/0140103 A1* | 7/2003 | Szeto et al. | 709/206 |
| 2004/0083297 A1* | 4/2004 | Gazzetta et al. | 709/229 |
| 2004/0103318 A1* | 5/2004 | Miller et al. | 713/201 |
| 2004/0148346 A1* | 7/2004 | Weaver et al. | 709/204 |
| 2004/0158609 A1* | 8/2004 | Daniell et al. | 709/206 |
| 2004/0158610 A1* | 8/2004 | Davis et al. | 709/206 |
| 2004/0205175 A1* | 10/2004 | Kammerer | 709/223 |
| 2005/0102365 A1* | 5/2005 | Moore et al. | 709/207 |
| 2006/0242241 A1* | 10/2006 | Tock et al. | 709/206 |

OTHER PUBLICATIONS

"Instant Messaging Gets Down To Business; AOL, Microsoft, and Yahoo focus on growing market with enterprise IM apps.(Brief Article)", Konzer, T., InformationWeek, CMP Media LLC, Mar. 1, 2003, 1 page.

(Continued)

Primary Examiner—Dohm Chankong
Assistant Examiner—Thomas J Dailey
(74) Attorney, Agent, or Firm—Lee & Hayes, PLLC

(57) ABSTRACT

Techniques are described that enable enterprise management of public instant message (IM) communications. When a user requests a connection with a public IM service, the connection request is redirected to a gateway server that is associated with a domain specified in the user's user ID. The gateway server acts as a pass through server between the user's IM client application and the public IM service. The gateway server may be configured to log IM communications in which the user participates. The gateway server may also be configured to control whether or not the user is able to participate in point-to-point communications through the user's IM client application. An enterprise routing server may also be implemented in a geo-distributed enterprise to route a redirected public IM connection request to an enterprise IM gateway server based on a geographic location associated with the user.

16 Claims, 9 Drawing Sheets

OTHER PUBLICATIONS

"Messaging in a 3G World", Angwin, A.J., IBM UK Laboratories, The Institution of Electrical Engineers, 2003, pp. 68-72.

"Instant Messaging in the Enterprise", Osterman, M., Business Communications Review, Jan. 2003, pp. 59-62.

"Instant Messaging Puts on a Business Suit", Lawton, G., IEEE Comput Soc., vol. 36, No. 3, Mar. 2003, pp. 14-16.

"Introducing Instant Messaging and Chat in the Workplace", Herbsleb et al., Paper: I Think, Therefore IM, CHI 2002: changing the world, changing ourselves, Apr. 20-25, 2002, vol. 4, Issue 1, pp. 171-178.

"Securing Instant Messaging", Schwartz, M., Enterprise Systems, Nov. 2002, pp. 25-27.

"Instant Messaging- an Instant Threat", Computer Fraud & Security, pp. 19-20.

"To Message or Not to Message", McEachem, C., Wall Street & Technology, Jan. 2003, pp. 34, 36, 37.

* cited by examiner

ENTERPRISE MANAGEMENT OF PUBLIC INSTANT MESSAGE COMMUNICATIONS

TECHNICAL FIELD

Embodiments of this invention relate to instant messaging, and more specifically to enabling enterprise management of public instant message communications.

BACKGROUND

Instant messaging (IM) has become a popular means of communication that, unlike email, enables users to engage in real-time digital conversations. Due to the ease with which digital communication can occur using instant messaging, some companies have begun allowing their employees to communicate company information via IM. As with email, many companies desire the ability to log the content of instant message communications in which their employees participate. This may be achieved for instances in which two employees of the same company participate in an instant message conversation while both logged into an instant messaging application that is provided by a company server. For example, a company may have Microsoft's Live Communication Server installed on a company network, which then enables communication between clients connected to the network using, for example, Microsoft's Windows Messenger. For example, two employees may log onto the company network using their computers at work or through a virtual private network (VPN) connection and use Microsoft's Windows Messenger to communicate with each other via instant messaging. Because the IM communication is enabled using software on the company network, such communication may be logged using additional software installed on the same network.

As described above, companies have the ability to log IM communications if all of the conversation participants are logged into the company network. This is insufficient in many cases, however, due to the fact that employees may be communicating with clients at other companies or may be wanting to communicate via IM from locations other than work, such as from home or while on travel, such as at an Internet kiosk in an airport. In such a scenario, an employee may log into an IM client, such as MSN Messenger, that is available over the Internet and participate in IM conversations as an employee of the company, but there is no way for the company to record a log of the conversation or to apply corporate policies in regard to the employee establishing the public IM connection. This is of great concern, especially in industries such as finance or healthcare, where communications by employees representing a company may be confidential or otherwise sensitive.

In addition to real-time digital conversations, many public IM services also provide the ability for two or more users connected to the public IM service to establish direct point-to-point connections (also commonly referred to as peer-to-peer connections). A point-to-point connection enables the users to exchange files and other data directly, without going through the public IM service.

Point-to-point communications raise an additional level of concern for companies in that a company has no control over what data an individual may be sharing while representing themselves as a company employee (via a user ID associated with the company).

Accordingly, a need exists for a company to have the ability to log instant message conversations that a user participates in while logged in as a company employee, regardless of whether or not the user is connected through a company controlled network. Alternatively, or additionally, a need exists for a company to have the ability to restrict participation in instant message conversations by employees who log into an instant message server from outside of a company controlled network. Furthermore, a need exists for companies to control whether or not their employees are allowed to participate in point-to-point communications, as enabled through an instant messaging client application.

SUMMARY

Multiple embodiments for enabling enterprise management of public instant message (IM) communications are described. In a particular embodiment, public instant message communications in which a user associated with a particular domain participates are logged by a public instant message service. The logged data may then be transmitted to a server associated with the domain.

In another embodiment, user requests to connect to a public instant message server are redirected to an enterprise instant message gateway server that is associated with the domain indicated by the user's user ID. The enterprise IM gateway server may be configured to verify that the user is a valid user associated with the enterprise and enforce one or more enterprise policies that may be associated with the user and public instant message connection requests. For example, certain enterprise employees may not be authorized to participate in public instant message communications. Additionally, enterprise policy may specify whether or not specific enterprise employees are authorized to establish point-to-point communication connections as may be enabled by a public instant message service.

After the enterprise IM gateway server verifies the user identity and applies any associated enterprise policies, if the user is authorized, the enterprise IM gateway server forwards the connection request to the public instant message service with data indicating that the request is being submitted from the enterprise IM gateway server. Upon authentication by the public instant message service of the enterprise IM gateway server identity and the user identity, a connection is established between the public instant message service and the user through the enterprise IM gateway server.

Enterprise IM gateway server may be configured to log public instant message communications in which the user participates in an enterprise IM data log.

In yet another embodiment, an enterprise environment may include multiple, geographically distributed enterprise IM gateway servers. Public IM service connection requests are redirected to an enterprise routing service, which then determines, based on a geographic location associated with the user, which of the multiple, geographically distributed enterprise IM gateway servers to which the connection request is to be redirected.

DETAILED DESCRIPTION

Overview

The embodiments described below allow enterprise management of instant message (IM) communications initiated through a public instant message system. When a user (using an IM client) requests a connection with a public IM service, the service checks the domain associated with the user. If the domain is identified as one for which connections are to be managed (to enable logging or monitoring of IM communications), then a monitored connection between the user and the public IM service is established.

In one implementation, the public IM service logs IM communications in which a user associated with a particular domain participates. At regular intervals (e.g., hourly, daily, or weekly), the data that is logged may then be transferred to a server associated with the domain.

In another implementation, connection requests associated with a particular domain that are received by the public IM service are redirected to an IM gateway server that is associated with the domain. A monitored connection between the user and the public IM service is then established through the IM gateway server. The IM gateway server is then able to log IM communications that pass through it.

Instant Message Communication Configurations

Figure 1:
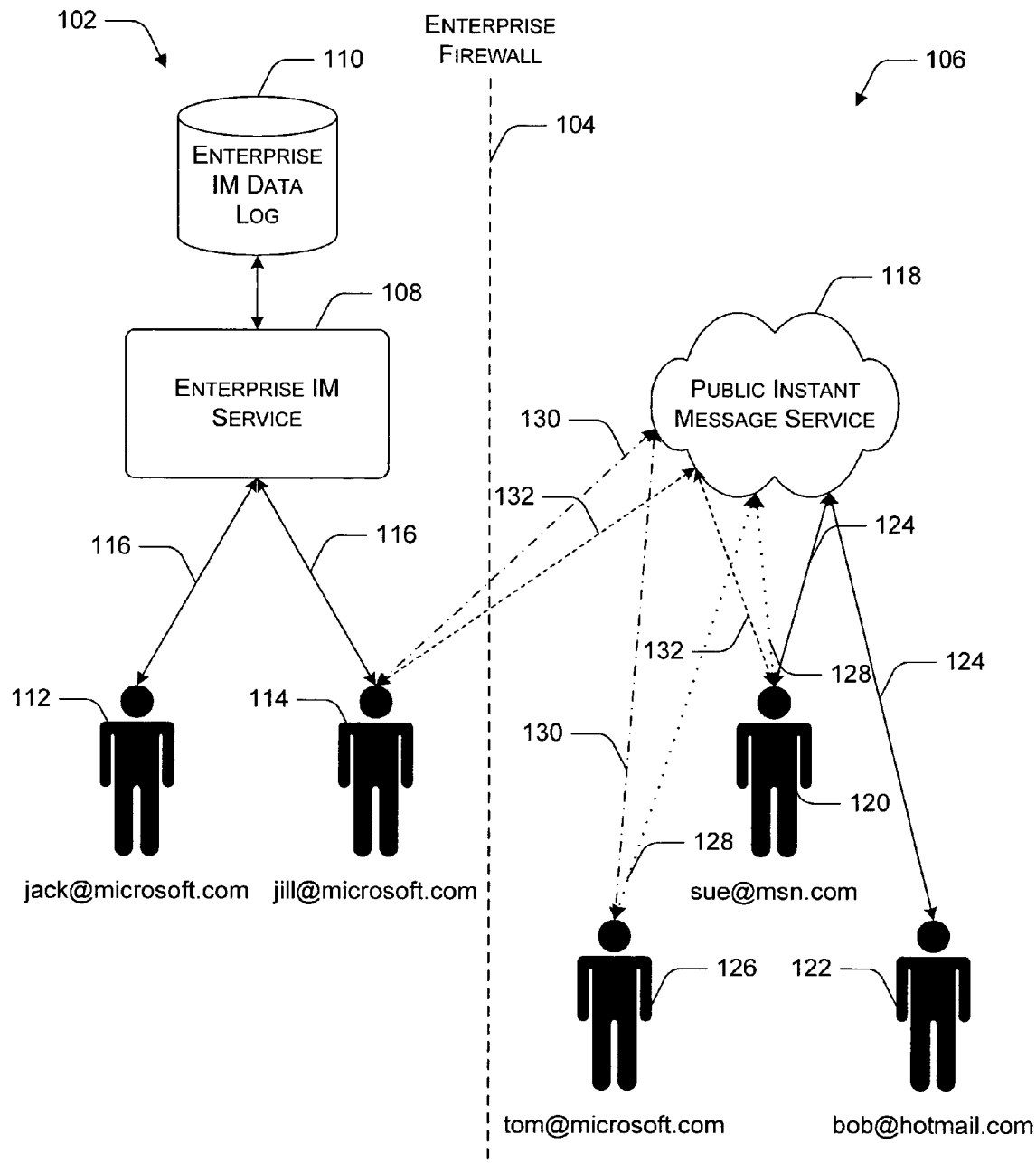
FIG. 1 is a block diagram that illustrates various instant message communication configurations for which data may be logged.

FIG. 1 illustrates various connection configurations through which instant message communications may be performed. The left side of FIG. 1 illustrates an enterprise environment 102 implemented, for example, as a corporate network, behind an enterprise firewall 104. The right side of FIG. 1 illustrates a public environment 106, such as the Internet.

Within the enterprise environment 102, an enterprise instant message service 108 may be implemented to enable enterprise employees to communicate within the enterprise network via IM. For example, enterprise IM service 108 may be implemented using Microsoft's Live Communication Server to support instant message communication using Microsoft's Windows Messenger client software. Instant message communications between users connected to the enterprise IM service 108 may be logged in enterprise IM data log 110. For example, assuming enterprise environment 102 is associated with Microsoft Corporation and has "microsoft.com" as an enterprise domain name, employees Jack 112 and Jill 114 may both log into enterprise IM service 108 (with user IDs jack@microsoft.com and jill@microsoft.com, respectively) and participate in an IM conversation 116. That conversation may be logged into enterprise IM data log 110 as an enterprise communication. In the illustrated example, Jack 112 and Jill 114 may be logged into the enterprise network in any number of ways, including but not limited to, via a network workstation or via a virtual private network (VPN) connection.

Similarly, in the public environment 106, users may participate in IM conversations via a public IM service 118, such as Microsoft's .NET Messenger Service. For example, two users not associated with the enterprise, Sue 120 and Bob 122, may connect to public IM service 118 using user IDs sue@msn.com and bob@hotmail.com, respectively. Because these two users have no association with the enterprise (based on the domains specified in their user IDs), there is no need to log a conversation 124 between these users. Alternatively, a company employee, Tom 126 may be working from home or while traveling, and connect to public IM service 118 using his work user ID, tom@microsoft.com. Tom 126 may then have a conversation 128 with Sue 120, who is not an enterprise employee. Because Tom 126 is connected to public IM service 118 as an enterprise employee (based on his user ID, tom@microsoft.com), conversation 128 should be logged as an enterprise communication.

In addition to logging into an enterprise IM service 108 from work or logging into a public IM service 118 from home, there may be times when an employee connects to public IM service 118 from work. The employee may then participate in instant message communications with other individuals who are connected to the public IM service 118. For example, Jill 114 may connect from work to public IM message service 118 and participate in an IM conversation 130 with Tom 126. Because Jill 114 and Tom 126 are both Microsoft employees, IM conversation 128 should be logged as an enterprise communication. Similarly, conversation 132 is between Jill 114 connected to the public IM service 118 from work and Sue 120 connected to the public IM service 118 from another location. Because Jill 114 is connected to the public IM service 118 as an enterprise employee, conversation 132 should also be logged as an enterprise communication.

Public Logging of Instant Message Communications

Figure 2:
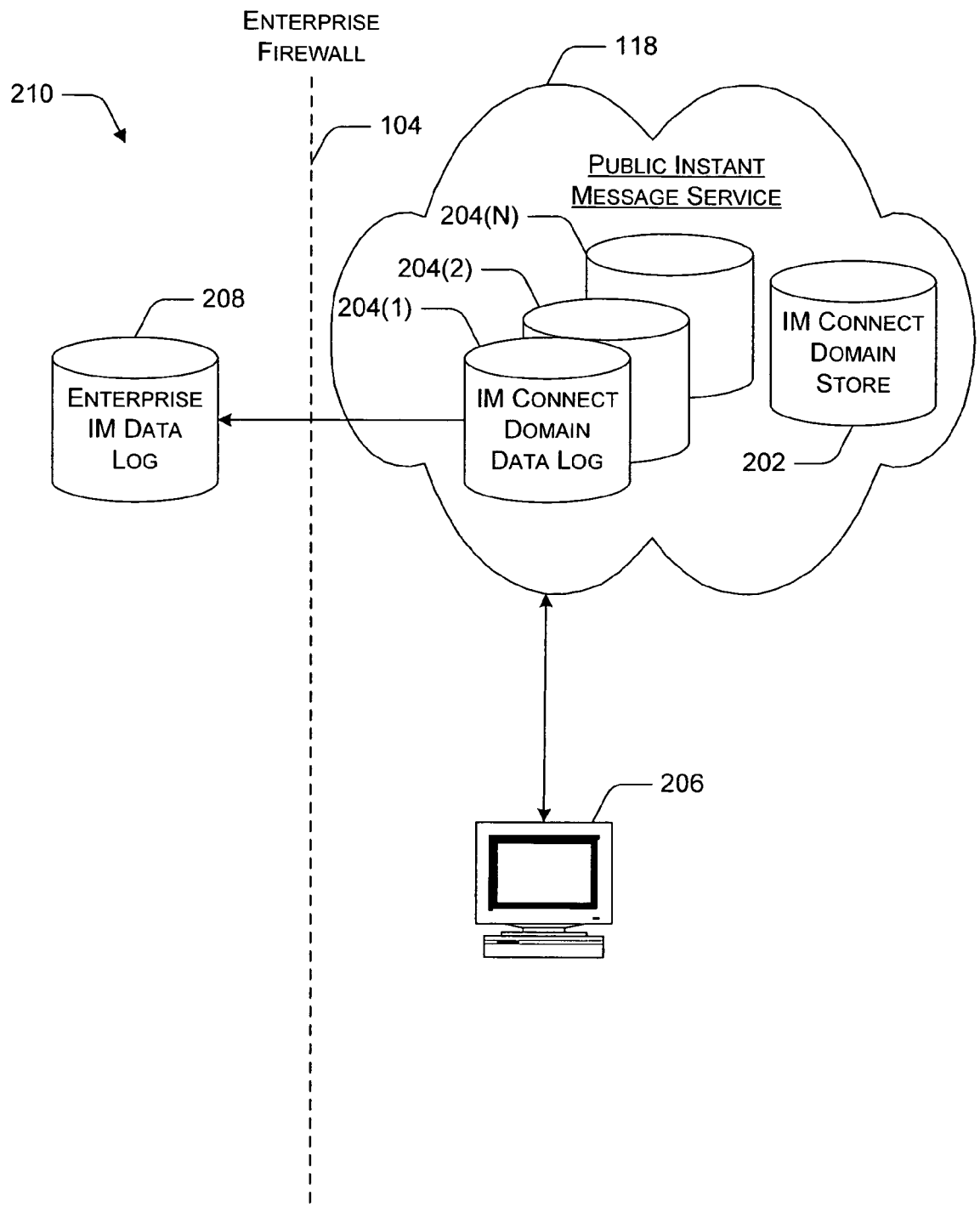
FIG. 2 is a block diagram that illustrates an exemplary environment in which a public instant message service may log domain-specific communications.

FIG. 2 illustrates an exemplary environment in which one or more domain data logs may be implemented as part of the public IM service 118 to enable logging of domain-specific instant message communications that occur through public IM service 118.

In the illustrated example, public IM service 118 includes IM connect domain store 202 and IM connect domain data logs 204(1), 204(2), . . . , 204(N). IM connect domain store 202 stores data that identifies domains for which instant message communications are to be logged. Each IM connect domain data log 204 is associated with a domain for which IM communications are to be logged, as indicated by the data stored in IM connect domain store 202.

When a user requests a connection to public IM service 118 using an IM client application 206, the service compares the user ID domain name with data stored in IM connect domain store 202. If the user is associated with an IM connect domain, then any IM conversations that the user participates in are logged in the IM connect domain data log 204 that is associated with the user's domain.

The data that is logged may then be transferred to enterprise IM data log 208, which resides on an enterprise network 210. In one implementation, an enterprise server (not shown) may connect to and download data from the IM connect domain store 204 that is associated with the enterprise. In an alternate implementation, public IM service 118 may, at regular intervals, automatically transmit to enterprise IM data log 208, any data that has been logged. Enterprise IM data log 208 may be implemented in any number of ways, including, but not limited to, as a database, an XML file, a collection of text files, etc.

Enterprise Logging of Instant Message Communications

Figure 3:
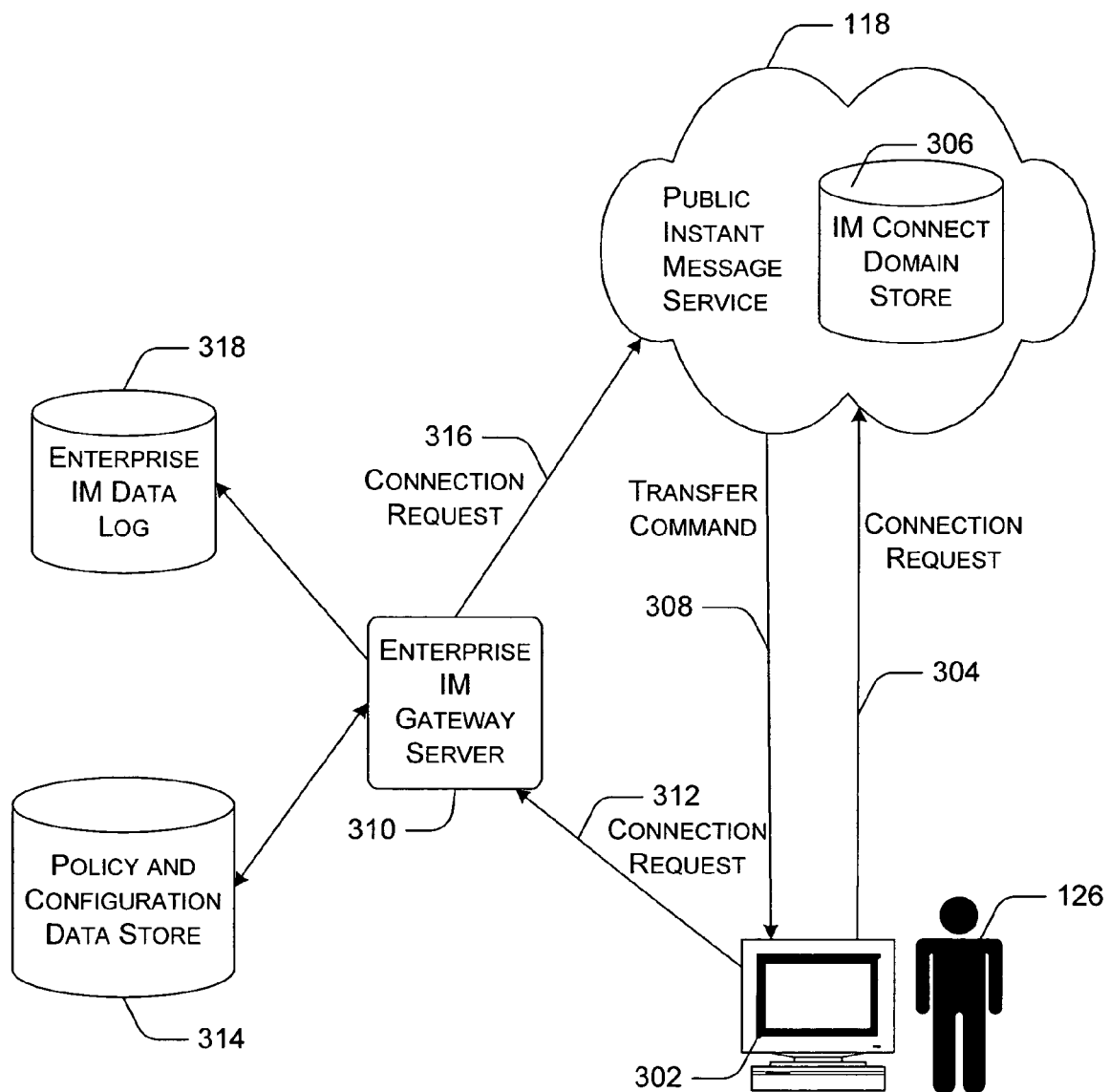
FIG. 3 is a block diagram that illustrates an exemplary environment in which an enterprise instant message gateway server may be implemented to enable logging of employee instant message communications.

FIG. 3 illustrates an exemplary environment in which an enterprise instant message gateway server may be implemented to enable logging of enterprise-related instant message communications that occur through public IM service 118.

In the illustrated example, an enterprise employee, Tom 126 uses an instant messaging client application 302 on his home computer to send a connection request 304 to public instant message service 118. Tom attempts to connect using his work user ID, "tom@microsoft.com". Public IM service 118 compares the requesting user ID to data stored in IM connect domain store 306 to determine whether or not the requesting user ID is associated with a domain for which connections are to be re-directed.

If the domain associated with the requesting user ID (e.g., "microsoft.com") is identified in IM connect domain store 306, then public IM service 118 issues a transfer command 308 back to the requesting instant messaging client application 302. The transfer command 308 specifies an IP address or domain name, along with a port number (or other type of identifier) associated with an alternate location through which IM connection requests associated with the requesting user's domain are to be submitted.

In the illustrated example, transfer command 308 identifies enterprise IM gateway server 310, which is maintained by the enterprise with which the user is associated. IM client application 302 then sends a connection request 312 to the port and IP address identified in the transfer command, which in this example, is enterprise IM gateway server 310.

Enterprise IM gateway server 310 examines the user ID associated with the request to verify that the requesting user is indeed a valid user associated with the enterprise domain. Enterprise IM gateway server 310 also determines what, if any, enterprise policies are to be applied in relation to public IM conversations the requesting user participates in. For example, some employees (e.g., management) may be allowed to participate in public IM conversations while representing the company while other employees are not allowed to participate in any public IM conversations while representing the company. Other policies may indicate whether or not a particular user is authorized to engage in point-to-point conversations that may be enabled through the public IM service 118.

In the illustrated implementation, enterprise policies are stored in policy and configuration data store 314. When enterprise IM gateway server 310 receives connection request 312, enterprise IM gateway server 310 verifies that the user is a valid enterprise user and that the user, based on enterprise policy, is allowed to participate in public IM conversations. For example, enterprise IM gateway server 310 accesses policy and configuration data store 314 to verify that the requesting user is a valid user associated with the enterprise and to identify any enterprise policies associated with the user.

After verifying that the requesting user is a valid user associated with the enterprise and verifying that, based on enterprise policy, the requesting user is authorized to participate in public IM communications, enterprise IM gateway server 310 submits a connection request 316 on behalf of the user to public IM service 118. Connection request 316 includes an identifier that indicates that the request is being submitted from enterprise IM gateway server 310.

Public IM service 118 then issues a first authentication challenge to verify that the IM gateway server from which the request was received is a valid IM gateway server, and also that it is an IM gateway server associated with the enterprise indicated by the domain name portion of the user ID. After receiving a valid response from enterprise IM gateway server 310, public IM service 118 issues a second authentication challenge to authenticate the client application 302 from which connection request 316 was received. Upon validation of both the enterprise IM gateway server 310 and the client application 302, a connection is established between public IM service 118 and instant messaging client application 302 through enterprise IM gateway server 310.

Once the connection has been established, any instant message communications in which Tom 126 participates are routed through enterprise IM gateway server 310, which may be configured to extract and/or log data associated with those communications in enterprise IM data log 318.

In addition to routing and logging instant message communications between IM client application 302 and public IM message service 118, enterprise IM gateway server 310 may also be configured to control whether or not the connected user may participate in point-to-point communications, which may be enabled through IM client application 302. For example, in the described implementation, communications between IM client application 302 and public IM service 118 include data that indicates whether or not IM client application 302 is configured to allow point-to-point communication. Enterprise IM gateway server 310 may be configured to modify the point-to-point configuration data that is sent from IM client application 302 to public IM service 118, effectively changing the IM client application configuration to not allow point-to-point communication.

Figure 4:
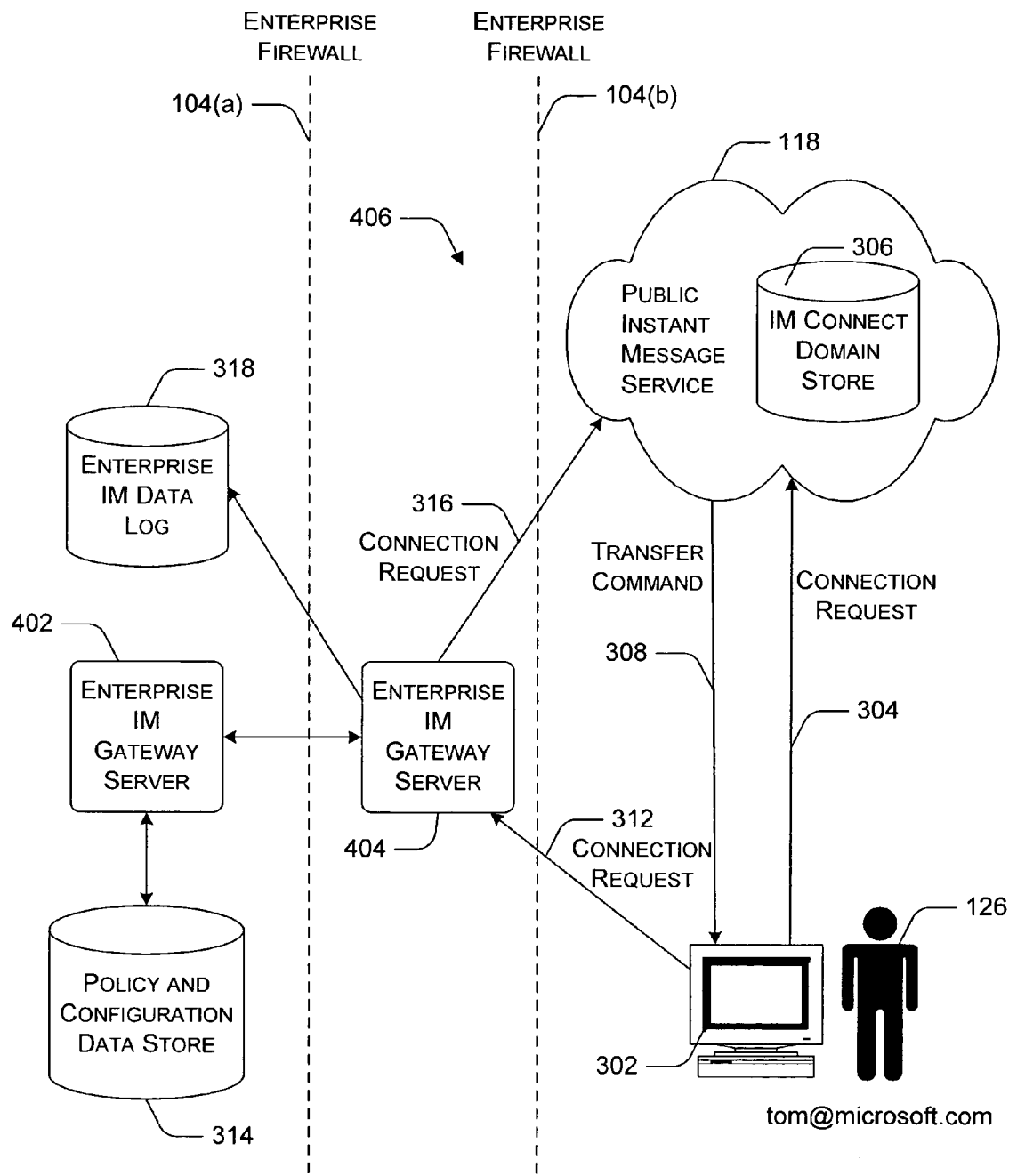
FIG. 4 is a block diagram that illustrates an exemplary environment in which multiple firewalled enterprise instant message gateway servers may be implemented to enable logging of employee instant message communications.

In the illustrated example, enterprise IM gateway server 310, policy and configuration data store 314, and enterprise IM data log 318 are controlled by the enterprise. For security reasons, it is likely that the enterprise would prefer to restrict access to one or more of those components. Accordingly, FIG. 4 illustrates an exemplary implementation in which an enterprise instant message gateway server may be implemented behind a firewall to enable logging of enterprise-related instant message communications that occur through public IM service 118.

In the illustrated example, policy and configuration data store 314 and enterprise IM data log 318 are implemented behind enterprise firewall 104(a). The illustrated example also includes two enterprise IM gateway servers—enterprise IM gateway server 402, which is implemented behind enterprise firewall 104(a); and enterprise IM gateway server 404, which is implemented in what is known as the "demilitarized zone" (DMZ) between enterprise firewall 104(a) and enterprise firewall 104(b). This implementation is designed to prevent unauthorized access from the outside to enterprise-sensitive data stored in enterprise IM data log 318 and policy and configuration data store 314.

In the illustrated example, an enterprise employee, Tom 126 uses an instant messaging client application 302 on his home computer to send a connection request 304 to public instant message service 118. Public IM service 118 compares the requesting user ID to data stored in IM connect domain store 306 to determine whether or not the requesting user ID is associated with a domain for which connections are to be re-directed.

If the domain associated with the requesting user ID is identified in IM connect domain store 306, then public IM service 118 issues a transfer command 308 back to the requesting instant messaging client application 302. The transfer command 308 identifies an alternate location through which IM connection requests associated with the requesting user's domain are to be submitted.

In the illustrated example, transfer command 308 identifies enterprise IM gateway server 404, which is within DMZ 406 between enterprise firewalls 104(a) and 104(b). IM client application 302 then sends a connection request 312 to enterprise IM gateway server 404 (as indicated by the data included in transfer command 308).

When enterprise IM gateway server 404 receives connection request 312, enterprise IM gateway server 404 communicates with enterprise IM gateway server 402 (which is located behind firewall 104(a)) to verify the user is a valid enterprise user and that the user, based on enterprise policy, is allowed to participate in public IM conversations. For example, enterprise IM gateway server 404 may transmit the user ID associated with connection request 312 to enterprise IM gateway server 402. Enterprise IM gateway server 402 then accesses policy and configuration data store 314 to verify that the requesting user is a valid user associated with the enterprise and to identify any enterprise policies associated with the user. Any identified enterprise policies associated with the requesting user are then transmitted from enterprise IM gateway server 402 to enterprise IM gateway server 404.

After verifying that the requesting user is a valid user associated with the enterprise and verifying that, based on enterprise policy, the requesting user is authorized to participate in public IM communications, enterprise IM gateway server 404 submits a connection request 316 on behalf of the user to public IM service 118. Connection request 316 also includes an identifier that indicates that the request is being submitted from enterprise IM gateway server 404.

As described above with reference to FIG. 3, public IM service 118 then issues a first authentication challenge to verify that the IM gateway server from which the request was received is a valid IM gateway server, and also that it is an IM gateway server associated with the enterprise indicated by the domain name portion of the user ID. After receiving a valid response from enterprise IM gateway server 404, public IM service 118 issues a second authentication challenge to authenticate the client application 302 associated with connection request 316. Upon validation of both the enterprise IM gateway server 404 and the client application 302, a connection is established between public IM service 118 and instant messaging client application 302 through enterprise IM gateway server 404.

Once the connection has been established, instant message communications in which Tom 126 participates are routed through enterprise IM gateway server 404, which may be configured to extract and/or log data associated with those communications in enterprise IM data log 318.

An alternate implementation may not include enterprise IM gateway server 404 or enterprise firewall 104(b). Rather, connection request 304 may be redirected to enterprise IM gateway server 402, which then verifies the requesting user identity and passes the connection request on to public IM service 118, as described above.

Another alternate implementation may include enterprise IM gateway server 404, but not include enterprise IM gateway server 402. Rather, the tasks described above as being performed by enterprise IM gateway server 402 are performed by enterprise IM gateway server 404.

In yet another implementation, enterprise IM data log 318 and/or policy and configuration data store 314 may be implemented within DMZ 406, rather than behind enterprise firewall 104(a). Furthermore, enterprise IM data log 318 may be implemented as a component of enterprise IM gateway server 402 or enterprise IM gateway server 404. Similarly, policy and configuration data store 314 may be implemented as a component of enterprise IM gateway server 402 or enterprise IM gateway server 404.

Geographically Distributed Enterprise Logging of IM Communications

Figure 5:
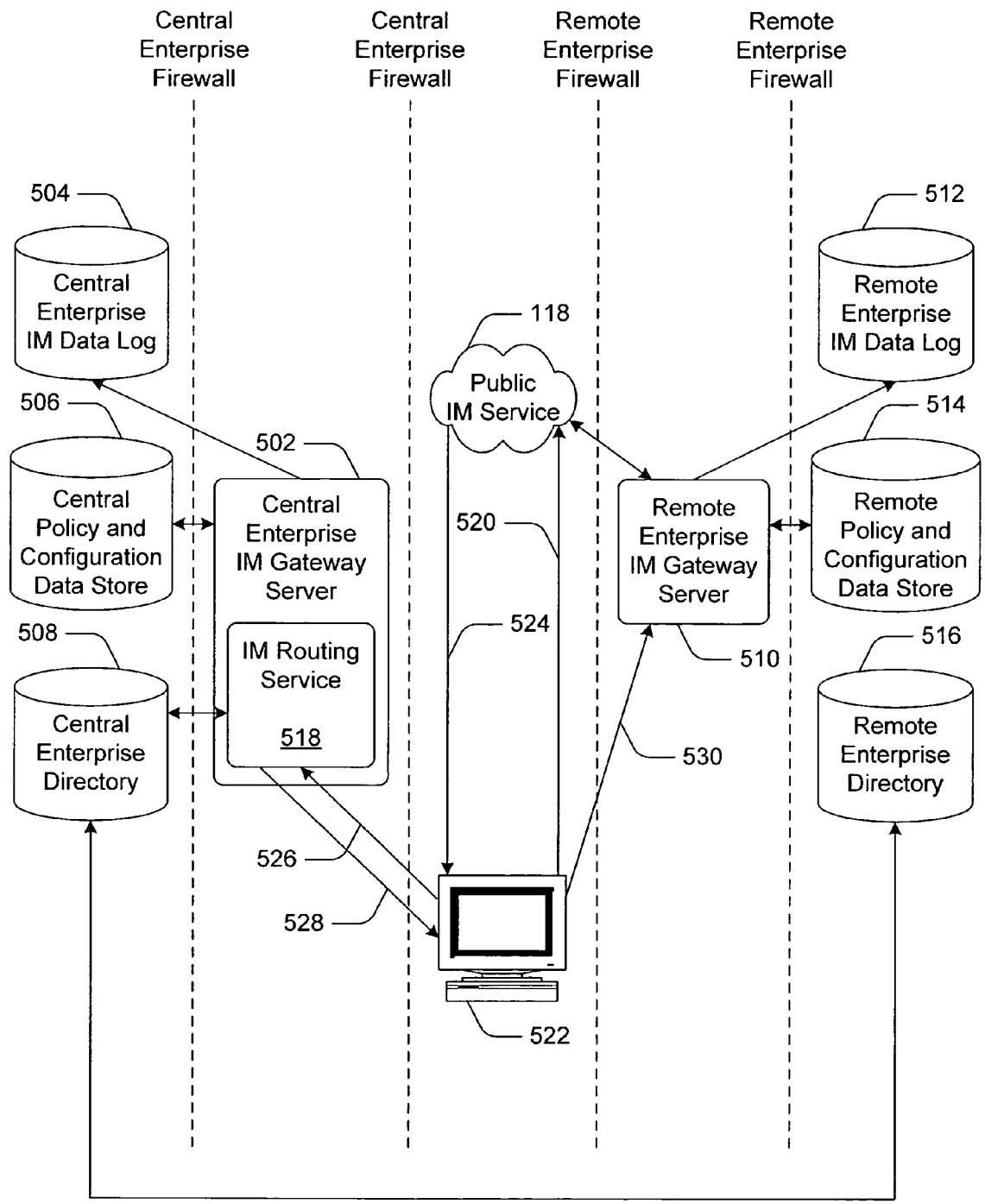
FIG. 5 is a block diagram that illustrates an exemplary geographically distributed enterprise environment in which enterprise instant message gateway servers may be implemented to enable logging of employee instant message communications.

FIG. 5 illustrates an exemplary geographically distributed environment in which enterprise instant message gateway servers may be implemented to enable logging of enterprise-related instant message communications that occur through public IM service 118.

In the illustrated example, an enterprise network includes a central network (e.g., located at corporate headquarters) and a remote network (e.g., located at another corporate office in another geographic location). For example, the central network may be located at an office in the United States while the remote network may be located at an office in Europe. In the described implementation, an enterprise-controlled routing service is used to route an employee IM connection request through an enterprise IM gateway server that is associated, geographically, with the employee.

For example, in the configuration illustrated in FIG. 5, the central enterprise network includes central enterprise IM gateway server 502, central enterprise IM data log 504, central policy and configuration data store 506, and central enterprise directory 508. Similarly, the remote enterprise network includes remote enterprise IM gateway server 510, remote enterprise IM data log 512, remote policy and configuration data store 514, and remote enterprise directory 516.

Central enterprise IM gateway server 502 and remote enterprise IM gateway server 510 are similar to enterprise IM gateway servers 310, 402, and 404, described above with reference to FIGS. 3 and 4. Central enterprise IM data log 504 and remote enterprise IM data log 512 are similar to enterprise IM data log 318 described above with reference to FIGS. 3 and 4. Central policy and configuration data store 506 and remote policy and configuration data store 514 are similar to policy and configuration data store 314 described above with reference to FIGS. 3 and 4.

In the illustrated example, central enterprise IM gateway server 502 also includes IM routing service 518. In alternate implementations, however, IM routing service 518 may be implemented as a component of another enterprise server, which may or may not be configured as an enterprise IM gateway server.

Central enterprise directory 508 maintains data that identifies for each enterprise employee, an enterprise IM gateway server through which public IM communications are to be routed. For example, central enterprise directory 508 may include a user ID, an IP address or DNS name, and a port number for each enterprise employee. For a user whose office is located at the enterprise headquarters (e.g., in the United States), the IP address or DNS name and port number may identify an enterprise IM gateway server that is associated with the central office, such as central enterprise IM gateway server 502. Similarly, for a user whose office is located at another enterprise office (e.g., in Europe), the IP address or DNS name and port number may identify an enterprise IM gateway server that is associate with the remote office, such as remote enterprise IM gateway server 510.

In an alternate implementation, central enterprise directory 508 may be implemented as part of central policy configuration data store 506. Similarly, remote enterprise directory 516 may be implemented as part of remote policy configuration data store 514.

IM routing service 518 is configured to determine which enterprise IM gateway server a particular user should be routed through for public IM communications. For example, IM routing service 518 examines data stored in central enterprise directory 508 to determine which enterprise IM gateway server a particular connection request should be routed through.

In an exemplary implementation, remote enterprise directory 516 and central enterprise directory 508 are synchronized to ensure that central enterprise directory 508 has an up-to-date list of employees and associated data.

The configuration illustrated in FIG. 5 is merely one example configuration of a geographically distributed enterprise network system. Other configurations are also contemplated, similar to those described above with reference to FIGS. 3 and 4.

To establish an instant messaging connection, an enterprise employee submits an IM connection request 520 to public IM service 118 using an IM client application 522. As described above with reference to FIG. 3, public IM service 118 issues a transfer command 524 back to IM client application 522. The transfer command 524 directs IM client application 522 to submit a connection request 526 to IM routing service 518.

IM routing service 518 then uses the user ID associated with connection request 526 to look up data in central enterprise directory 508 to determine whether or not to issue a transfer command IM client application 522. If the data in central enterprise directory 508 indicates that the user is associated with central enterprise IM gateway server 502, then IM routing server 518 passes connection request 526 to central enterprise IM gateway server 502, and processing continues as described above with reference to FIGS. 3 and 4.

On the other hand, if the data in central enterprise directory 508 indicates that the user is associated with remote enterprise IM gateway server 510, then IM routing server 518 issues a transfer command 528 to IM client application 522, indicating that the connection is to be established through remote enterprise IM gateway server 510.

IM client application 522 than submits connection request 530 to remote enterprise IM gateway server 510. Processing then continues in a manner similar to that described above with reference to FIGS. 3 and 4. An instant messaging connection may be established between IM client application 522 and public IM service 118 through remote enterprise IM gateway server 510. Whether or not the connection is established, and specific parameters of the connection (e.g., which, if any, point-to-point connections are allowed) may be based on data that remote enterprise IM gateway server 510 extracts from remote policy and configuration data store 514. If the connection is established, remote enterprise IM gateway server 510 may be configured to log any public IM communications in remote enterprise IM data log 512.

Although not illustrated, central policy and configuration data store 506 and remote policy and configuration data store 514 may be synchronized on a regular basis. Similarly, central enterprise IM data log 504 and remote enterprise IM data log 512 may also be synchronized. Alternatively, rather than synchronizing, data stored in either remote policy and configuration data store 514 or remote enterprise IM data log 512 may be uploaded at regular intervals to central policy and configuration data store 506 or central enterprise IM data log 504, respectively. By doing so, a complete data log or policy store may be maintained on the central enterprise network.

Public IM Service Components

Figure 6:
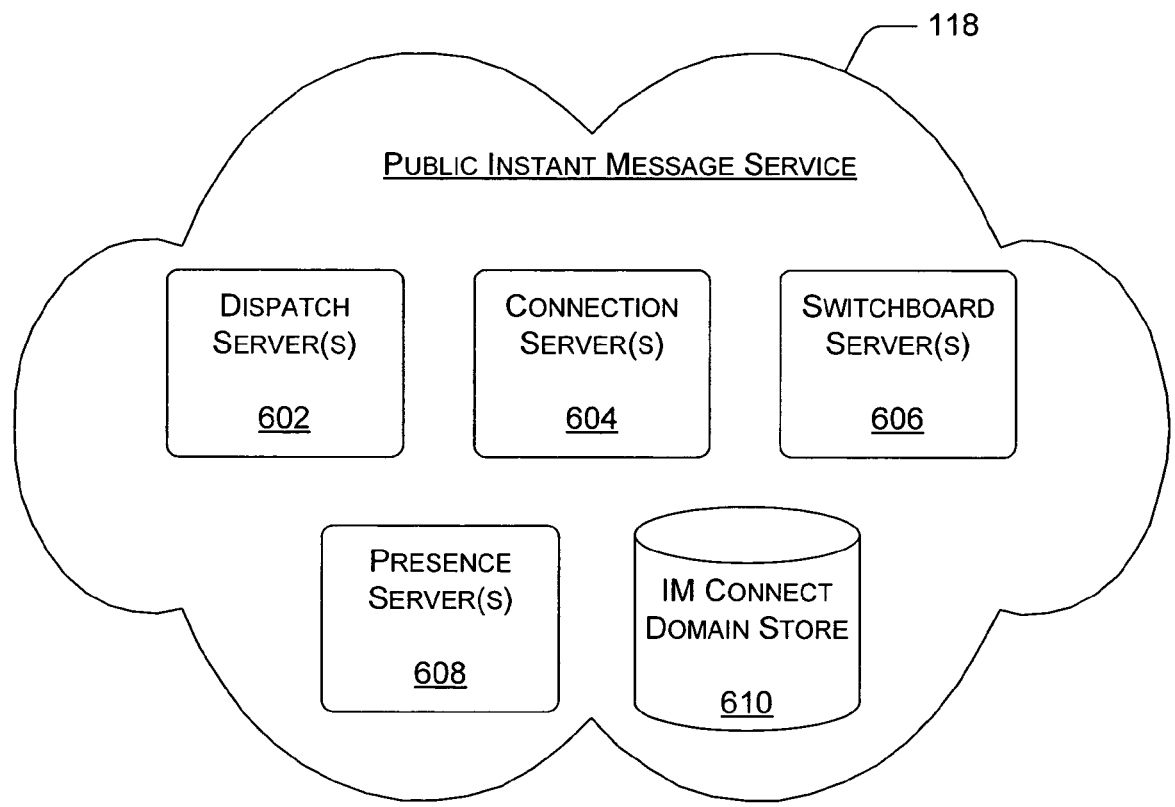
FIG. 6 is a block diagram that illustrates select components of an exemplary public instant message service.

FIG. 6 illustrates select components of an exemplary public IM service 118. In the illustrated example, public IM service 118 includes one or more dispatch servers 602, one or more connection servers 604, one or more switchboard servers 606, one or more presence servers 608, and IM connect domain store 610 (which corresponds to IM connect domain store 202 shown in FIG. 2 and IM connect domain store 306 shown in FIGS. 3 and 4).

Dispatch server 602 is responsible for re-directing IM connection requests that are received from a user associated with an IM connect domain. Dispatch server 602 receives a connection request, determines whether or not IM connect is enabled for the domain associated with the request, and if so, issues a transfer command, redirecting the request to an IM gateway server associated with the domain. If the request is not from a user associated with an IM connect domain or if the request is received through an enterprise IM gateway server (indicating that it is a request that has already been redirected), then the connection request is passed off to connection server 604.

Connection server 604 is responsible for establishing and maintaining a user connection. Connection server 604 receives a connection request from dispatch server 602 and authenticates the client application from which the connection request was received, for example by issuing a challenge to which a valid response must be returned. (If the connection request was received from an IM gateway server, then connection server 604 also authenticates the IM gateway server from which the connection request was received.) Once the connection is established, connection server 604 monitors the connection.

Switchboard server 606 is responsible for receiving and routing IM communications between two or more connected users.

Presence server 608 is responsible for maintaining states associated with each IM user, and pushing that information to other IM users so that when a user connects, they are able to see, for example, whether or not other users they have identified as contacts are also connected.

As described above, IM connect domain store 610 maintains a list of domains for which IM connections are to be redirected. IM connect domain store 610 may also store data indicating domains for which public IM service connections are not to be allowed. More specifically, IM connect domain store 610 may include the following data fields:

| Field Name | Description |
| --- | --- |
| Domain | Domain Name (e.g., "microsoft.com") |
| IM Connect Enabled | True or False - indicates whether or not connections associated with the domain are to be redirected. |
| Transfer IP Address | Redirection address associated with the domain. |
| Transfer Domain Name | Domain Name associated with system to which connections are to be redirected. |
| Port Number | Identifier associated with a port through which redirected connection requests are to be submitted. |
| Managed Namespace Authorization Enabled | True or False - indicates whether or not non-redirected connections associated with the domain are to be allowed (e.g., in the case where the IM connect enabled field has a value of "False"). |
| IM ID/Key Pair | Unique identifier associated with the enterprise that is represented by the domain. |

IM Connection Redirection

Figure 7:
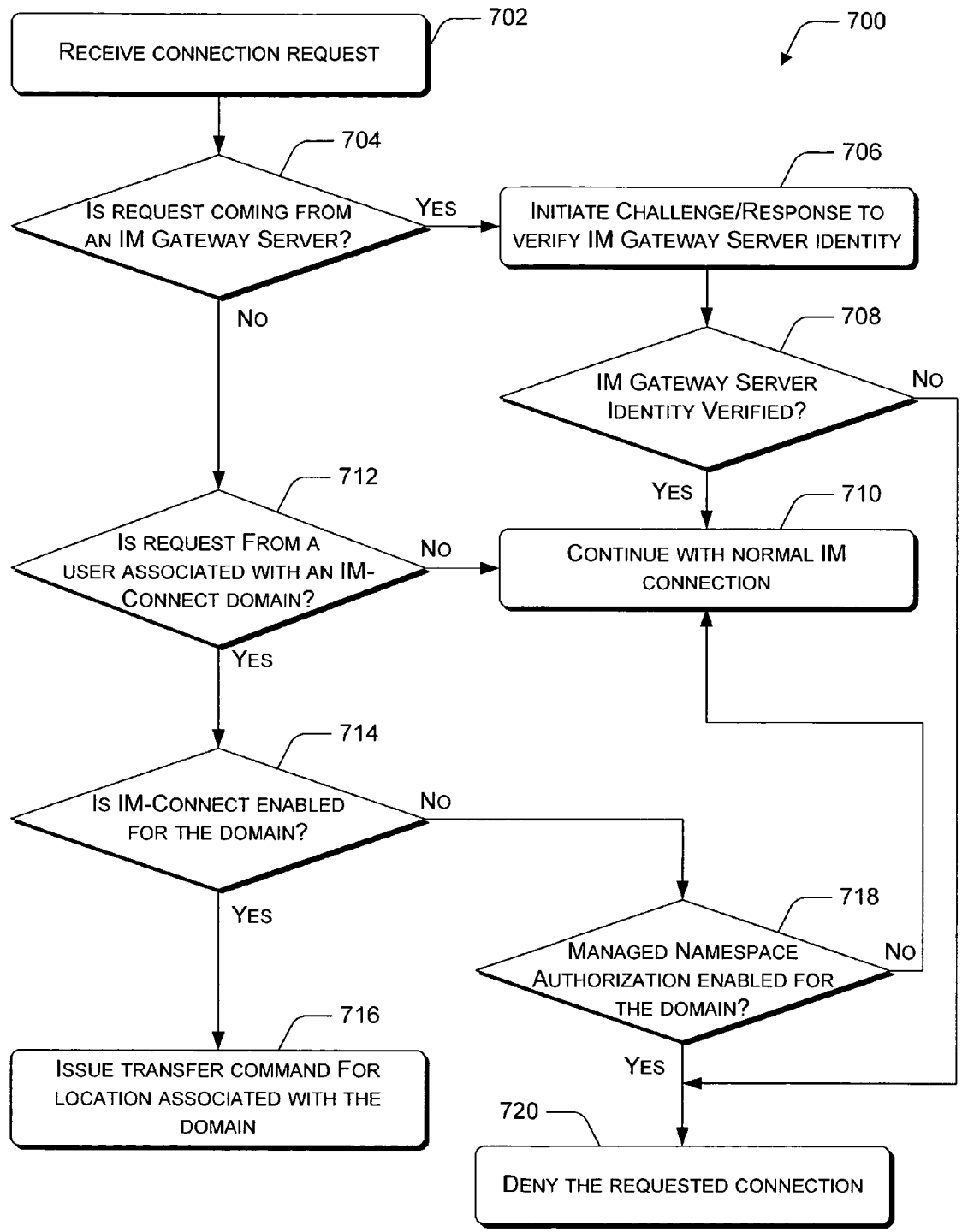
FIG. 7 is a flow diagram that illustrates an exemplary method for re-directing an instant message connection request from a public instant message server to an enterprise instant message gateway server.

FIG. 7 is a flow diagram that illustrates an exemplary method 700 for managing requests for connections to a public IM service. The illustrated process can be implemented in any suitable hardware, software, firmware or combination thereof. FIG. 7 is described for example purposes with respect to components shown in FIGS. 3 and 6.

At block 702, a public IM service receives a connection request. For example, dispatch server 602 may receive a connection request specifying a user ID (e.g., tom@microsoft.com) from IM client application 302. Alternatively, dispatch server 602 may receive a connection request from enterprise IM gateway server 310 specifying a unique identifier that indicates that the connection request is being received from a particular enterprise IM gateway server. For example, in one implementation, a string that is a concatenation of a name of a company that produced the IM gateway server and a domain name associated with the enterprise may be used as a unique enterprise IM gateway server identifier.

At block 704, the public IM service determines whether or not the request is being received from an IM gateway server. Dispatch server 602 examines data included with the connection request to determine whether or not an enterprise IM gateway server is specified. For example, in the described implementation, when enterprise IM gateway server 310 receives a redirected connection request, enterprise IM gateway server 310 adds data to the connection request before passing it on to public IM service 118. The data that is added (e.g., a unique enterprise IM gateway server identifier as described above with reference to block 702) identifies the enterprise IM gateway server 310 through which the connection request is being passed.

If the request is being received from an IM gateway server (the "Yes" branch from block 704), then at block 706, public IM service 118 initiates a challenge/response to verify the IM gateway server identity. For example, dispatch server 602 passes the connection request to connection server 604. Connection server 604 then issues a challenge to enterprise IM gateway server 310 to which a valid response must be submitted.

At block 708, public IM service 118 determines whether or not the identity of the IM gateway server has been verified. In the described implementation, connection server 604 verifies that an IM gateway server response to the challenge has been received and that it identifies the IM gateway server as a valid IM gateway server associated with the domain specified by the user ID.

If the IM gateway server identity is verified (the "Yes" branch from block 708), then at block 710, the connection processing then continues as a standard public IM connection, which is well known to those skilled in the art. The standard IM connection processing includes a second challenge/response to verify the identity of the requesting client application.

If, on the other hand, the IM gateway server identify is not verified (the "No" branch from block 708), then at block 720, connection server 604 denies the connection request.

If however, the request is not being received from an IM gateway server (the "No" branch from block 704), then at block 712, the public IM service determines whether or not the request is associated with an IM connect domain. For example, dispatch server 602 parses the user ID associated with the connection request to identify the domain name. Dispatch server 602 then searches a list of domain names stored in IM connect domain store 610 for the domain name associated with the connection request.

If the request is not associated with an IM connect domain (the "No" branch from block 712), then at block 710, the connection processing continues as a standard IM connection.

If however, the request is associated with an IM connect domain (the "Yes" branch from block 712), then at block 714 the public IM service determines whether or not IM connect is enabled for the specified domain. For example, dispatch server 602 examines the "IM connect enabled" field in IM connect domain store 610 to determine whether or not IM connect (i.e., connection redirection) is enabled for the identified domain.

If IM connect is enabled for the specified domain (the "Yes" branch from block 714), then at block 716 the public IM service issues a transfer command to the requesting IM client application. In the described implementation, the transfer command specifies an IP address (or DNS name) and a port number to which connection requests associated with the specified domain are to be re-directed.

If however, IM connect is not enabled for the specified domain (the "No" branch from block 714), then at block 718 the public IM service determines whether or not managed namespace authorization is enabled for the specified domain, which means that non-redirected connections to the public IM service are not allowed. For example, dispatch server 602 examines the "managed namespace authorization enabled" field in IM connect data store 610 to determine whether or not managed namespace authorization is enabled for the identified domain.

If managed namespace authorization is not enabled for the specified domain (the "No" branch from block 718), then at block 710 processing continues as a standard IM connection.

If however, managed namespace authorization is enabled for the specified domain (the "Yes" branch from block 718), then at block 720 the public IM service denies the requested connection.

Enterprise IM Gateway Server Components

Figure 8:
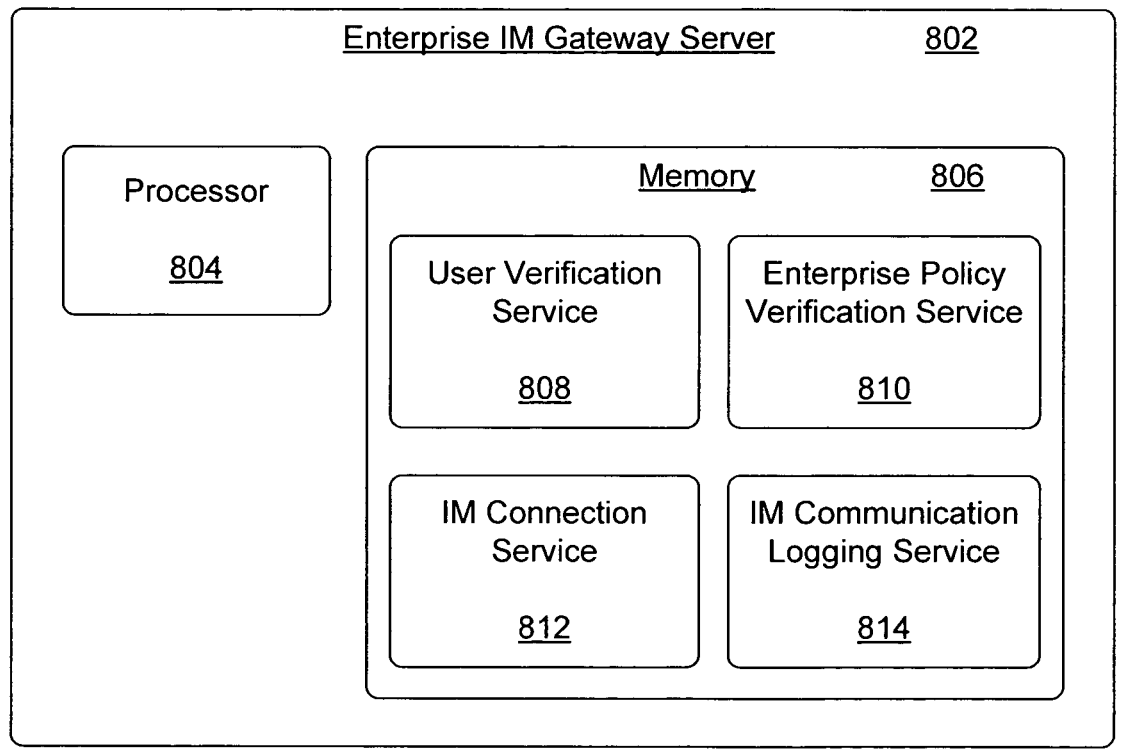
FIG. 8 is a block diagram that illustrates select components of an exemplary enterprise IM gateway server.

FIG. 8 illustrates select components of an exemplary enterprise IM gateway server 802. Enterprise IM gateway server 802 is representative of enterprise IM gateway servers 310, 402, 404, 502, and 510 illustrated in FIGS. 3-5. In the illustrated example, enterprise IM gateway server 802 includes a processor 804 and a memory 806. User verification server 808, enterprise policy verification service 810, IM connection service 812, and IM communication logging service 814 are specific components that may be stored in memory 806 and executed on processor 804. Although shown as software components stored in memory, in alternative implementations, each of these components may be implemented as hardware, software, firmware, or any combination thereof.

User verification service 808 is configured to receive an IM connection request and verify that the requesting user is associated with the enterprise.

Enterprise policy verification service 810 is configured to apply any enterprise policies associated with the requesting user in establishing a public IM connection. For example, enterprise policy verification service 810 examines data stored in policy and configuration data store 314 to determine whether or not the requesting user is authorized to participate in public IM communications. Furthermore, enterprise policy verification service 810 may also use data stored in policy and configuration data store 314 to determine which, if any, point-to-point services the requesting user is authorized to participate in.

Instant message connection service 812 is configured to establish a connection to public IM message service 118 on behalf of the requesting user. For example, instant message connection service 812 submits a connection request to public IM service 812, and responds to authorization challenges that may be issued as part of a establishing a public IM service connection.

Instant message communication logging service 814 is configured to log any data communicated to or from the user through a public IM service connection that is established between the user and the public IM service 118 through the enterprise IM gateway server 310.

Enterprise IM Gateway Server Processing

Figure 9:
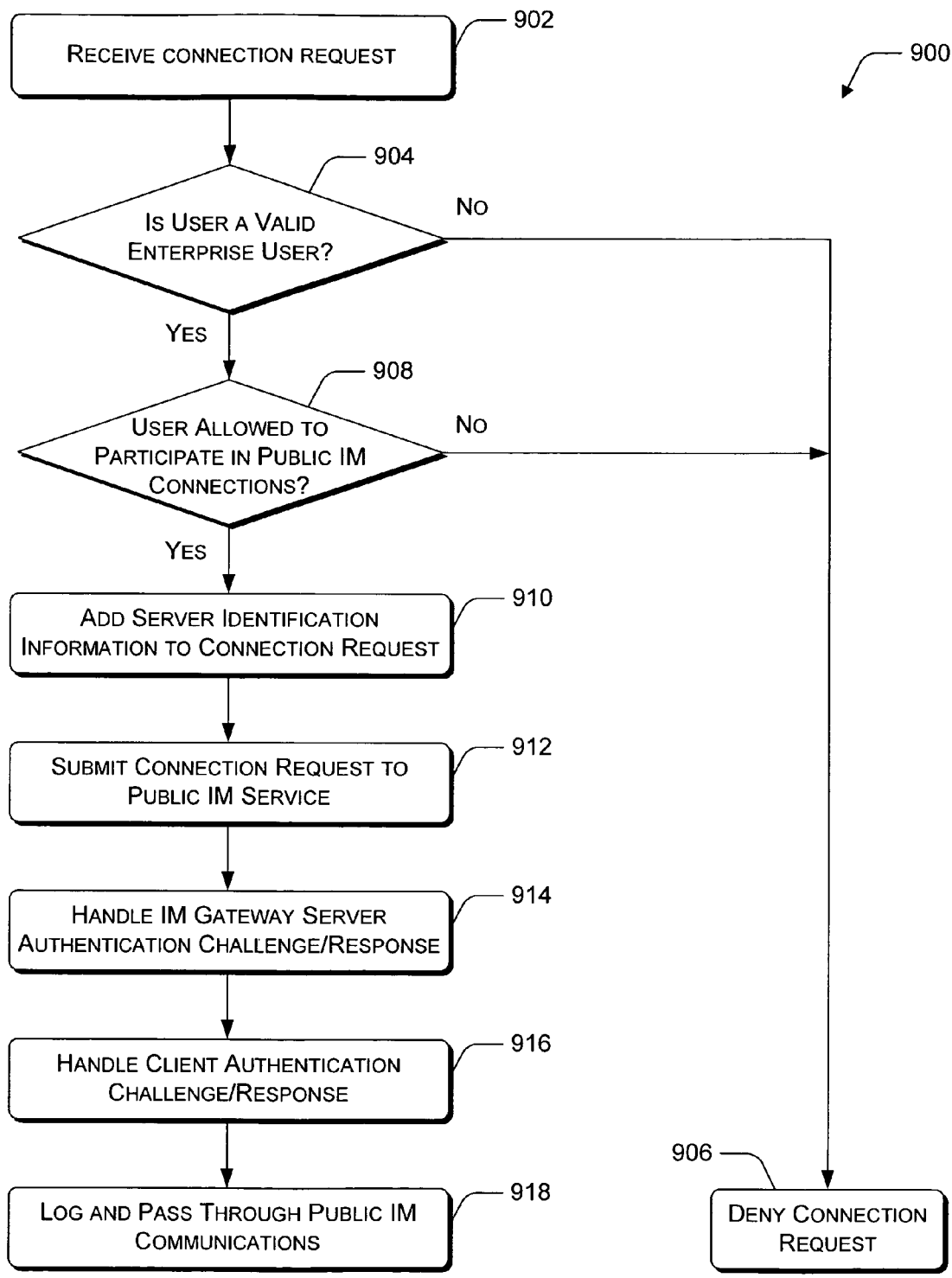
FIG. 9 is a flow diagram that illustrates exemplary processing that may be performed by the enterprise IM gateway server illustrated in FIG. 8.

FIG. 9 is a flow diagram that illustrates an exemplary method 900 that may be performed by an enterprise IM gateway server to enable logging of public IM communications. The illustrated process can be implemented in any suitable hardware, software, firmware or combination thereof. FIG. 9 is described for example purposes with respect to components shown in FIGS. 3 and 8.

At block 902, enterprise IM gateway server 310 receives a connection request. For example, user verification service 808 may receive a re-directed connection request specifying a user ID (e.g., tom@microsoft.com) from IM client application 302.

At block 904, enterprise IM gateway server 310 verifies the requesting user's identity. For example, user verification service 808 determines whether or not the requesting user is associated with the enterprise.

If the user is not a valid user associated with the enterprise (the "No" branch from block 904), then at block 906, user verification service 808 denies the requested connection.

If on the other hand, the user verification service 808 determines that the requesting user is a valid enterprise user (the "Yes" branch from block 904), then at block 908, enterprise IM gateway server determines whether or not the requesting user is allowed to establish a public IM connection. For example, enterprise policy verification service 810 examines data stored in policy and configuration data store 314 to determine what, if any, enterprise policies apply to the requesting user.

If it is determined that the requesting user is not allowed to participate in public IM communications (the "No" branch from block 908), then at block 906, enterprise policy verification service 810 denies the connection request.

If, on the other hand, it is determined that the requesting user is allowed to participate in public IM communications (the "Yes" branch from block 908), then at block 910, enterprise IM gateway server 310 adds server identification information to the connection request. For example, IM connection service 812 may add a unique string identifier associated with the enterprise IM gateway server 310 to a particular portion of the connection request.

At block 912, the connection request is submitted to public IM service 118. For example, IM connection service 812 submits the connection request to public IM service 118.

At block 914, enterprise IM gateway server 802 handles a server authentication challenge. For example, IM connection service 812 receives challenge from public IM service 812, and the IM connection service 812 responds with a key or other piece of data that the public IM service is expecting in response to the challenge.

At block 916, enterprise IM gateway server 802 handles a client application authentication challenge. For example, IM connection service 812 receives a client application authentication challenge from public IM service 812. In one implementation, IM connection service 812 may respond to the challenge on behalf of the client application. In an alternate implementation, IM connection service 812 may pass the authentication challenge through to the client application, wait for a response, and then pass the response through to public IM service 118.

At block 918, enterprise IM gateway server 802 passes through and logs any IM communications that the user is participating in. For example, IM connection service 812 controls the pass through of IM communications to or from the user. As the communications are passed through enterprise IM gateway server 802, IM communication logging service 814 logs data associated with the IM communications, for example, in an enterprise IM data log.

CONCLUSION

The techniques described above enable enterprise management of public instant message communications. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
  receiving a connection request at dispatch server of a publicly-accessible (public) instant message service enabling public instant message communications between two or more users,
  wherein the connection request represents a request submitted by a user through an instant message client application;
  determining whether the connection request is being received via an instant message gateway server;
  in an event that connection request is being received from an instant messaging gateway, issuing an authentication challenge to authenticate an identity of the instant messaging gateway server from which the connection request is submitted;
  in an event that the connection request is not being received from an instant message gateway server, determining whether the connection request is from a user associated with a domain identified in a instant message connect domain store of said publicly-accessible instant message service,
  wherein said instant message connect domain store stores domain names that identify domains for which instant message service connection requests are to be redirected; and
  in an event that the connection request is from a user associated with a domain identified in the instant message connect domain store, issuing a transfer command to the instant message client application,
  wherein the transfer command identifies an enterprise instant message gateway server to which the connection request is redirected and through which the user's instant message communications are managed.

2. The method as recited in claim 1
  verifying the user is authorized to participate in public instant messaging communications by examining data stored in an enterprise policy and configuration data store of the enterprise instant message gateway server.

3. The method as recited in claim 1 further comprising:
  determining whether the user is authorized to participate in point-to-point communications as may be enabled through the public IM service; and
  in an event that the user is not authorized to participate in point-to-point communications, altering the connection request to include data that indicates that the user is not authorized to participate in point-to-point communications through the public IM service.

4. A system comprising:
an enterprise instant message gateway server managing public instant message conversations in which an enterprise user participates; and
a publicly-accessible (public) instant message service, the public instant message service enabling public instant message communications between two or more users, wherein the public instant message service comprises:
an instant message connect domain store storing domain names that identify domains for which instant message service connection requests are to be redirected; and
a dispatch server comprising a processor and memory, with instructions encoded on the memory, the instructions when executed by the processor directing the dispatch server to perform acts comprising:
receiving a connection request, wherein the connection request represents a request submitted by a user through an instant message client application;
determining whether the connection request is being received via an instant message gateway server;
in an event that connection request is being received from an instant messaging gateway, issuing an authentication challenge to authenticate an identity of the instant messaging gateway server from which the connection request is submitted;
in an event that the connection request is not being received from an instant message gateway server, determining whether the connection request is from a user associated with a domain identified in the instant message connect domain store; and
in an event that the connection request is from a user associated with a domain identified in the instant message connect domain store, issuing a transfer command to the instant message client application, the transfer command identifying the enterprise instant message gateway server to which the connection request is redirected.

5. The system as recited in claim 4 wherein the instant message connect domain store is configured to store at least one of a domain name, an instant message connect enabled indicator, a transfer IP address, a transfer domain name, a port number, a managed namespace authorization enabled indicator, or an instant messaging ID/Key pair.

6. The system as recited in claim 4 wherein the public instant message service further comprises a connection server configured to establish and maintain a connection between the instant message service system and the user through an instant message gateway server.

7. The system as recited in claim 4 wherein the public instant message service further comprises a switchboard server configured to route instant message communication data received from and directed to the user.

8. The system as recited in claim 4 wherein the public IM service further comprises an enterprise-specific data log configured to store data associated with public IM communications directed to or from a user associated with a particular enterprise.

9. The system as recited in claim 4, further comprising an enterprise network that is separate from the public instant message service, wherein the enterprise network comprises an enterprise-specific data log configured to store data associated with public IM communications directed to or from a user associated with a particular enterprise.

10. The system as recited in claim 8 wherein the enterprise-specific data log is implemented as at least one of a database, one or more XML files, or one or more text files.

11. The system as recited in claim 4 wherein the public instant message service is further configured to verify that the gateway server is a valid gateway server associated with an enterprise with which the user is associated.

12. The system as recited in claim 4 wherein the enterprise instant message gateway server is further configured to:
request a connection to the public instant message service on behalf of the enterprise user; and
route instant message conversation data between the public instant message service and the enterprise user.

13. The system as recited in claim 4 wherein the enterprise instant message gateway server is further configured to generate a log of the instant message conversation data.

14. The system as recited in claim 4 further comprising:
a second enterprise instant message gateway server, geographically distributed from the other enterprise instant message gateway server, the second enterprise instant message gateway server also configured to manage public instant message conversations in which an enterprise user participates;
an enterprise directory configured to maintain data identifying at least one enterprise instant message gateway server through which public IM communications are to be routed for at least one enterprise user, wherein the enterprise instant message gateway servers are associated with enterprise users based on a geographical location of the enterprise user; and
an enterprise routing service configured to route a connection request from the user to the enterprise instant message gateway server or to the second enterprise instant message gateway server, wherein the enterprise routing service routes the connection request as designated by the enterprise directory.

15. The system as recited in claim 14 wherein the enterprise routing service is further configured to determine whether to route the connection request from the user to the enterprise instant message gateway server or to the second enterprise instant message gateway server based on data that identifies a geographical location associated with the user.

16. The system as recited in claim 4 further comprising a policy and configuration data store configured to maintain data that identifies enterprise policies to be applied when the enterprise user requests a connection to the public instant message service.

* * * * *